US 8,640,103 B2

(12) United States Patent
Sheppard

(10) Patent No.: US 8,640,103 B2
(45) Date of Patent: Jan. 28, 2014

(54) RAPID APPLICATION INNOVATION UTILIZING AN ORTHOGONAL PROGRAMMING COMPONENT

(75) Inventor: Edward G. Sheppard, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1496 days.

(21) Appl. No.: 11/747,438

(22) Filed: May 11, 2007

(65) Prior Publication Data

US 2008/0282233 A1 Nov. 13, 2008

(51) Int. Cl.
*G06F 9/44* (2006.01)

(52) U.S. Cl.
USPC .......................................................... 717/125

(58) Field of Classification Search
USPC .......... 717/120, 127, 104, 104.128, 124–125;
709/224, 227, 221, 205; 340/539.16,
340/286.06; 705/7, 32, 39; 714/38.12;
370/395.2
See application file for complete search history.

(56) References Cited

U.S. PATENT DOCUMENTS

| | | | |
|---|---|---|---|
| 6,195,678 B1 | 2/2001 | Komuro | |
| 6,216,162 B1 | 4/2001 | Dutcher et al. | |
| 6,308,173 B1 | 10/2001 | Glasser et al. | |
| 6,473,895 B1 * | 10/2002 | Lopes et al. | 717/128 |
| 6,539,390 B1 * | 3/2003 | Kiczales et al. | 1/1 |
| 6,748,555 B1 * | 6/2004 | Teegan et al. | 714/38.12 |
| 2005/0010574 A1 * | 1/2005 | Vaught | 707/10 |
| 2005/0021725 A1 | 1/2005 | Lobbert | |
| 2005/0234928 A1 | 10/2005 | Shkvarchuk | |
| 2006/0026570 A1 * | 2/2006 | Chan et al. | 717/127 |
| 2006/0075112 A1 * | 4/2006 | Polozoff | 709/227 |
| 2006/0212517 A1 * | 9/2006 | Rohall et al. | 709/205 |
| 2007/0006325 A1 | 1/2007 | Gargaro | |
| 2007/0033167 A1 | 2/2007 | Basu et al. | |
| 2007/0038610 A1 | 2/2007 | Omoigui et al. | |

FOREIGN PATENT DOCUMENTS

WO WO 2006020758 A2 2/2006
WO WO 2006089411 A1 8/2006

OTHER PUBLICATIONS

Zhang et al, "Aspectizing Middleware Platforms", Jan. 2003, pp. 1-15.*
Zhang et al., "Refactoring Middleware with Aspects", IEEE Nov. 2003, pp. 1-16.*
Verheecke et al, "AOP for Dynamic Configuration and Management of Web Services", ICWS-Europe 2003, LNCS 2853, pp. 137-151.*
Lee, C., Helal, S., "Context Attributes: An Approach to Enable Context-awareness for Service Discovery", Computer and Information Science and Engineering Department, University of Florida, pp. 1-9, Gainesville, FL, US, 2003.

(Continued)

*Primary Examiner* — Tuan A Vu
(74) *Attorney, Agent, or Firm* — Merchant & Gould

(57) ABSTRACT

Embodiments are provided to utilize an orthogonal or independent programming component to rapidly develop new features for use in computer application programs through the testing of new application program concepts on a server. In one embodiment, the orthogonal programming component intercepts a request to access an application program stored on the server and, if the request meets certain predefined criteria, sends the request to a treatment component to implement the new application concepts without changes having to be made to the application program stored on the server.

17 Claims, 4 Drawing Sheets

(56) References Cited

OTHER PUBLICATIONS

Obraczka, K., Danzig, P.B., Li, S-H, "Internet Resource Discovery Services", Computer Sciences Department, University of Southern California, IEEE Computer Magazine, vol. 26, No. 9, pp. 8-22, Sep. 1993, US.

Sinha, S., Lindvall, M., Rus, I., "Software Systems Support for Knowledge Management", 2004 Project Performance Corporation, pp. 1-20, McLean, VA, US.

Lee, C., Helal, S., "Context Attributes: An Approach to Enable Context-awareness for Service Discovery", Computer and Information Science and Engineering Department, University of Florida, pp. 1-9, Gainesville, FL, US.

* cited by examiner

RAPID APPLICATION INNOVATION UTILIZING AN ORTHOGONAL PROGRAMMING COMPONENT

BACKGROUND

In hosted services environments for multiple computer users, testing, evaluating, and deploying innovations to computer program applications, including web-based applications, can be an extremely time-consuming process. After an improvement to an existing application has been conceived, the application must be re-programmed to incorporate the improvement into the existing application, tested for errors, evaluated to determine the effectiveness of the improvement, and finally deployed for use by users in the hosted environment. For example, the deployment of a new web-based application may be introduced to change the location of an advertisement on a web page as a way to determine if the new location will generate more "clicks" and thus a greater potential for advertising revenue, from visitors to a hosted website.

In an attempt to speed up the deployment of new applications in hosted services environments, Control/Treatment ("CT") "experiments," (also called A/B tests, controlled experiments, randomized experiments, and parallel flights) may be utilized in "live" environments. In conventional CT experiments, live users may be randomly assigned to one of two variants: (i) the Control, which is commonly the "existing" version of an application, and (ii) the Treatment, which is usually a new version of the application being evaluated. Metrics of interest, ranging from runtime performance to implicit & explicit user behaviors and survey data, are collected. Statistical tests are then conducted on the data collected to evaluate whether there is a statistically significant difference between the two application versions, thus enabling the acceptance or rejection of hypotheses about the value of the new version. Currently, however, CT experiments require that either the existing version of the application be redeployed to incorporate the experimental features to be evaluated (thus creating the new version) or that an additional dependent programming layer be added to the existing version implementing application programming interfaces ("APIs") which delegates user application requests to either the Control or Treatment versions based on how a user has been assigned. One drawback associated with application redeployment is that additional time and resources must be expended to stop the execution of the existing application (e.g., taking down a website) in order to modify the program to include the experimental features. One drawback associated with the additional programming layer is that this layer is dependent on the Control and Treatment application versions. Thus, when the APIs associated with the applications change, the programming code associated with the additional programming layer must also be changed since the layer implements the APIs. Further, the additional programming layer adds an extra "hop" or step in the data path between the requesting user and the applications, thus increasing latency. Still further, although the additional programming layer may be removed when experiments are not running, data center personnel must perform configuration changes (such as Domain Name System updates) to avoid impacting user client applications. It is with respect to these considerations and others that the various embodiments of the present invention have been made

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to utilize an orthogonal or independent programming component to rapidly develop new features for use in computer application programs through the testing of experiments (i.e., an application program modified with new application program features) on a client or server computer. In one embodiment, the orthogonal programming component intercepts a request to access an application program stored on the server and, if an experiment is running and the request meets certain predefined criteria, sends the request to a treatment component to implement the experiment for testing new application concepts without changes having to be made to the application program stored on the server.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided to utilize an orthogonal or independent programming component to rapidly develop new features for use in computer application programs through the testing of experiments (i.e., an application program modified with new application program features or existing application program features which have been modified) on a server. In one embodiment, the orthogonal programming component intercepts a request to access an application program stored on the server and, if an experiment is running and the request meets certain predefined criteria, sends the request to a treatment component to implement the experiment for testing new application concepts without changes having to be made to the application program stored on the server.

Figure 1:
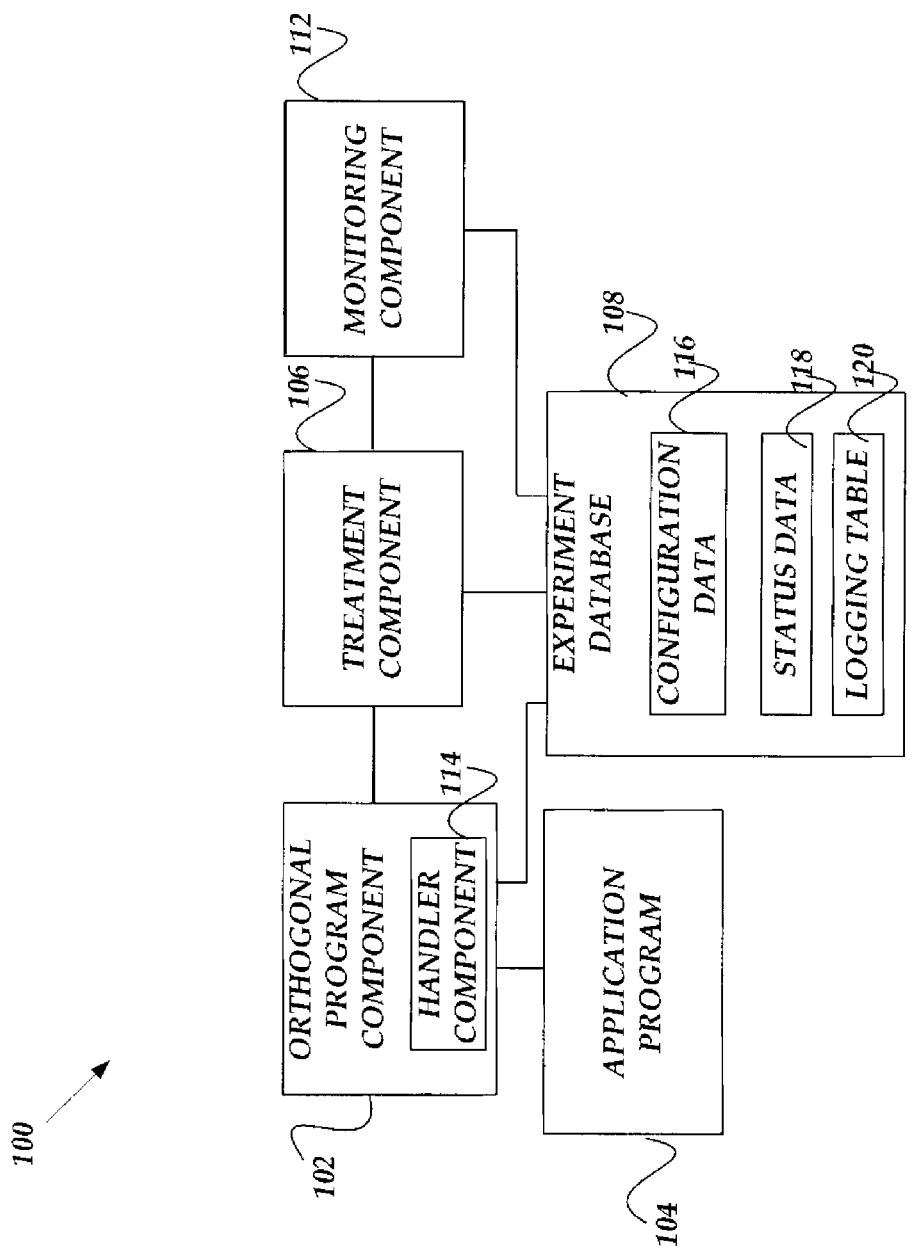
FIG. 1 is a conceptual diagram of a system configured to utilize an orthogonal programming component to expedite the testing of new application program concepts, in accordance with various embodiments.

Referring now to the drawings, in which like numerals represent like elements, various illustrative embodiments will now be described. FIG. 1 is a conceptual diagram of a system 100 that is configured to utilize an orthogonal programming component to expedite the testing of new application program concepts, in accordance with an embodiment. For example, the system 100 may operate to utilize the orthogonal programming component to intercept user application program requests and route certain numbers of these requests to a treatment component to test new features associated with the requested user application program. The orthogonal programming component may be further utilized to route other user application program requests which will not be utilized to test the new features to the requested application program for normal execution. It should be appreciated that the orthogonal programming component is independent of the application program and thus enables the testing of new features without changes having to be made to the application program and without the application program having to be redeployed in the system.

As described below, the orthogonal programming component utilized in the system 100 may be an aspect-oriented programming component ("AOP") which, as known to those skilled in the art, enables the introduction of new functionality into objects without the objects' needing to have any knowledge of that introduction. In particular, AOP provides a solution for abstracting cross-cutting code that spans object hierarchies without functional relevance to the code it spans. Instead of embedding cross-cutting code in classes, AOP enables the abstraction of cross-cutting code into a separate module (known as an aspect) which may then applied the code dynamically where it is needed. Dynamic application of the cross-cutting code may be achieved by defining specific places (known as pointcuts) in an object model where cross-cutting code should be applied. At runtime or compile time, cross-cutting code is injected at the specified pointcuts. The system 100 and its components include functionality to communicate with other computing devices, communication devices, and/or other systems and is not intended to be limited to the embodiments and examples described herein.

As shown in FIG. 1, the system 100 includes, without limitation, an orthogonal programming component 102, an application program 104, a treatment component 106, an experiment database 108, and a monitoring component 112. In one embodiment, the system 100 may comprise a web server which includes an assistance platform ("AP"). As is known to those skilled in the art, an AP may be utilized as a help engine for client computer systems to support online searches for help in finding marketing content for websites and for providing feedback. For example, an AP is utilized for supporting online searches for the Office Online search engine provided by MICROSOFT CORPORATION of Redmond, Wash.

The orthogonal programming component 102 includes, without limitation, a handler component 114. As will be described in greater detail below, the orthogonal programming component 102 may be an AOP component configured to intercept user requests for accessing the application program 104 and invoke the treatment component 106 with respect to the user requests based on predefined criteria which may be stored as configuration data 116 in the experiment database 108. The treatment component 106 may comprise program code or other data for implementing an experimental behavior. In accordance with various embodiments, the experimental behavior may include new features associated with the requested application program or modified existing features associated with the requested application program. For example, the application program 104 may be configured to generate a web page with a banner advertisement for a website on the left side of the web page. An advertiser wishing to evaluate a metric of interest (such as evaluating whether repositioning the banner to the right side of the web page would generate more user clicks on the banner, and thus potentially increased advertising revenue) may request a developer to write program code (i.e., a treatment component) to implement this new behavior based on a predetermined number of client users (or other criteria) who request access to the web page.

It should be appreciated that in accordance with other embodiments, the experimental behavior may also be implemented for testing new hardware in a computer system or to recompile the requested application program (to look for errors, for example). It should be understood that in accordance with various embodiments, the treatment component 106 is invoked and the experimental behavior is implemented without changes having to be made to the application program 104 and without the application program 104 having to be redeployed. The orthogonal programming component 102 may also route requests which do not qualify for new feature testing to the application program 104. It should be appreciated that the orthogonal programming component 102 may utilize the handler component 114 for routing user requests to the application program 104. The handler component 114 may be an event handler (e.g., a Hypertext Transfer Protocol ("HTTP") handler). In one embodiment, the handler component 114 may be an ASP.NET Request handler for routing requests to managed ASP.NET web applications. The functionality of the orthogonal programming component 102 will be discussed in greater detail below with respect to FIG. 3.

The application program 104 may be a managed server application program configured to provide functionality for performing tasks in response to user requests received from one or more connected client computers. For example, in accordance with an embodiment, the application program 104 may comprise a web server application program for generating web pages. In one embodiment, the application program 104 may comprise an ASP.NET web application program. As is known to those skilled in the art, ASP.NET is a server-side Web technology used to create dynamic web applications such as web pages and web services. ASP.NET takes an object-oriented programming approach to web page execution. Every element in an ASP.NET page is treated as an object and run on the server. An ASP.NET page gets compiled into an intermediate language by a .NET Common Language Runtime ("CLR") compliant compiler which is turned into native machine code by a compiler. The machine code is eventually run on a computer processor resulting in the rapid loading of web pages. It should be understood that the application program 104 is not limited to ASP.NET applications but may include any Hypertext Transfer Protocol ("HTTP") application program including other web server applications. In one embodiment, the treatment component 106 may comprise branches of the application program 104 with additional program code for implementing the new application program concepts undergoing evaluation as well as program code for logging the results of user activity which may be utilized for analysis, and configuration data.

The experiment database 108 may be utilized to store configuration data 116, status data 118, and a logging table 120. The configuration data 116 may include conditions or predefined criteria to be analyzed by the orthogonal programming component 102, to invoke the treatment component 106 to implement experimental behaviors. For example, the conditions may establish that the treatment component 106 will be invoked to implement an experimental behavior for twenty percent of user requests for the application program 104, that the experimental behavior should be implemented for ten days, etc. The status data 118 may comprise data indicating a current status of the treatment component 106 (e.g., whether or not the treatment component is running). The logging table 120 may be utilized to record events associated with implementing an experimental behavior. For example, the logging table 120 may be employed in the system 100 to record that a request was forwarded for treatment (e.g., the request was forwarded to a treatment server in invoking the treatment component 106) or that a running treatment component was aborted. The logging table 120 may also be available to the treatment component 106 where it can place details of how a treatment request was handled or details about the request.

The monitoring component 112 may comprise an application program configured to monitor a running treatment component 106 and determine if the running treatment component 106 should be automatically terminated based on one or more criteria including, without limitation, a predetermined number of errors returned during the execution of the treatment component 106 or a predetermined time period that the treatment component 106 has been running. The functionality of the monitoring component 112 will be discussed in greater detail below with respect to FIG. 4.

Exemplary Operating Environment

Figure 2:
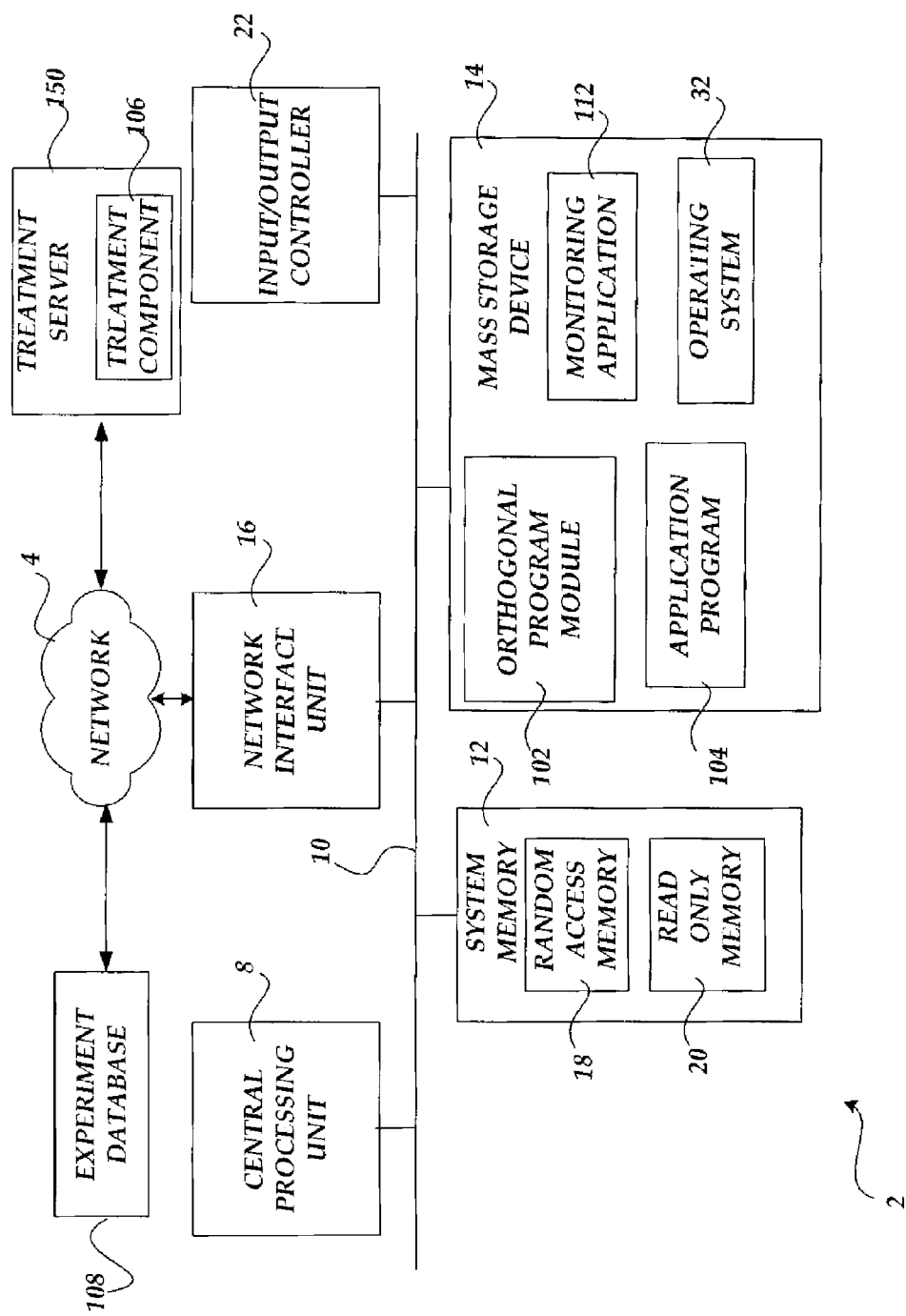
FIG. 2 is a block diagram illustrating a computing environment for implementing various embodiments described herein.

Referring now to FIG. 2, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 2, an illustrative operating environment for embodiments of the invention will be described. As shown in FIG. 2, a computer 2 comprises a general purpose desktop, laptop, handheld, tablet, or other type of computer capable of executing one or more application programs. It will be appreciated by those skilled in the art that the application programs executed by the computer 2 may be either server or client application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, orthogonal program module 102 (corresponding to the orthogonal programming component discussed above with respect to FIG. 1), the application program 104, and a monitoring application 112 (corresponding to the monitoring component 112 discussed above with respect to FIG. 1). The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network or a wide area network (e.g., the Internet), for example. The server computer 2 may connect to the network 4 through a network interface unit 16 connected to the bus 10. As shown in FIG. 2, the network 4 connects the computer 2 to the experiment database 108 and a treatment server 150. In accordance with an embodiment, the treatment server 150 may be utilized to execute the treatment component 106 to implement an experimental behavior. It will be appreciated that in accordance with one embodiment, the functionality of the treatment server 150 and the experiment database 108 may be integrated within the computer 2.

It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store the orthogonal program module 102, the application program 104, and the monitoring application 112.

Figure 3:
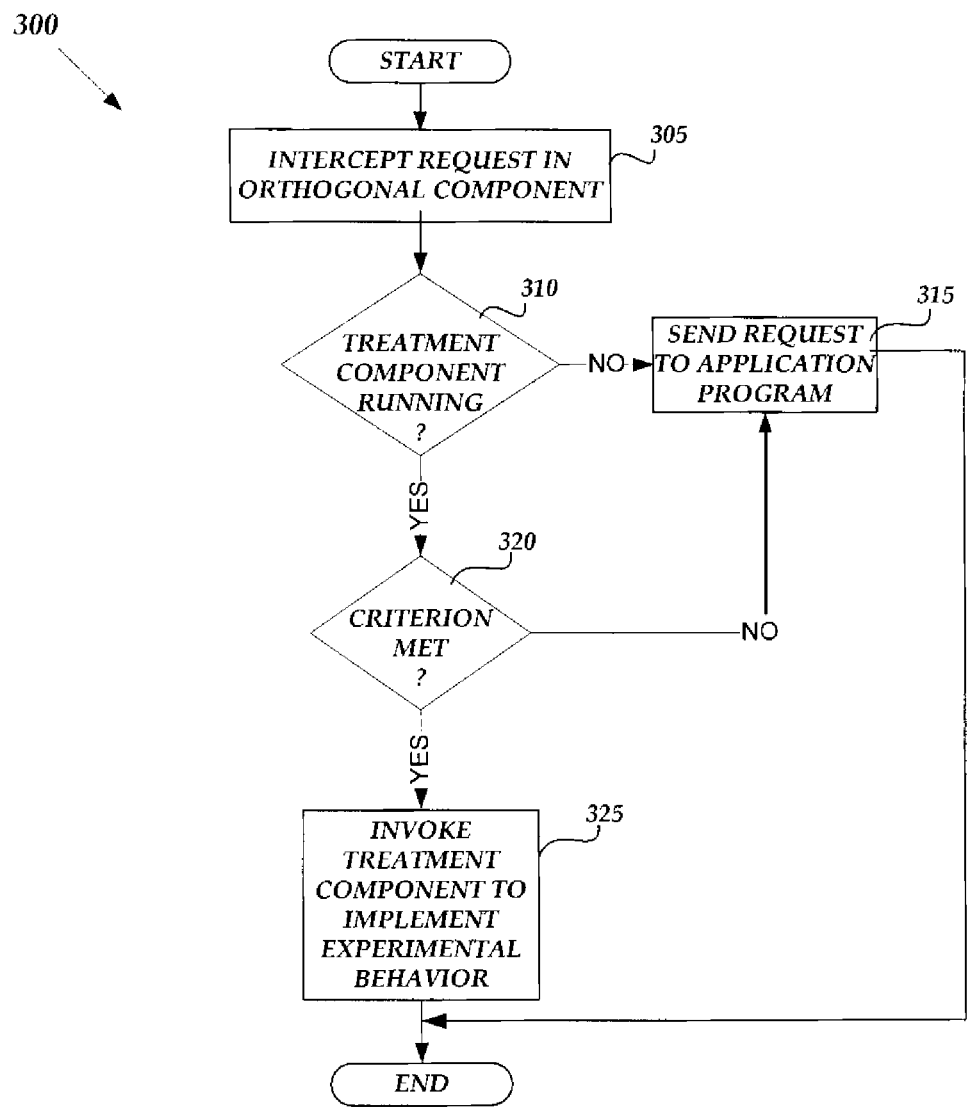
FIG. 3 is a flow diagram illustrating a routine for utilizing an orthogonal programming component to expedite the testing of new application program concepts on a server, in accordance with various embodiments.

FIG. 3 is a flow diagram illustrating a routine for utilizing an orthogonal programming component to expedite the testing of new application program concepts on a server, under an embodiment. The components of FIGS. 1 and 2 are referred to in the description of FIG. 3, but the embodiment is not so limited. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3 and 4 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 300 begins at operation 305, where the orthogonal programming component 102 intercepts a request for accessing the application program 104. For example, the orthogonal programming component 102 may receive a request directed from a client computer to the application program 104 for opening a web page. As discussed above with respect to FIG. 1, the orthogonal programming component may comprise an aspect oriented programming component. According to an embodiment, the request may comprise an HTTP request. In accordance with an alternative embodiment, the request may comprise a Simple Object Access Protocol ("SOAP") request.

From operation 305, the routine 300 continues to operation 310, where the orthogonal programming component 102 determines whether the treatment component 106 for implementing an experimental behavior is currently running in the system 100. In particular, the orthogonal programming component 102 may be configured to access the status data 118 in the experiment database 108 to determine whether the treatment component 106 is currently executing in the system 100.

If, at operation 310, it is determined that the treatment code 106 not currently executing, then the routine 310 continues to operation 315 where the orthogonal programming component 102 forwards the request to the application program 104. As discussed above with respect to FIG. 1, the orthogonal programming component 102 may utilize an event handler, such as an HTTP request handler (e.g., an ASP.NET Asynchronous Request Handler) to forward the request to the application program 104 for normal processing.

If, at operation 310, it is determined that the treatment code 106 is currently executing, then the routine 300 branches to operation 320 where the orthogonal programming component 310 determines whether a criterion for the currently executing treatment component 106 has been met. It should be understood that the criterion may be arbitrarily complex and may further employ Boolean logic. For example, a criterion for executing the treatment component 106 may be: a user is referred by a specific website and the request is for a website home page and the user is currently not logged in to the website. In particular, the orthogonal programming component 310 may be configured to retrieve the criterion for the currently executing treatment component 106 experiment from the experiment database 108 (through the utilization of an API call, for example) and to retrieve identification data from the request to determine based on the retrieved criterion and the identification data, whether the criterion has been met. In one embodiment, the request may be an HTTP message and the identification data may be retrieved from an HTTP header for the HTTP message. In an alternative embodiment, the request may be a SOAP message and the identification data may be retrieved from a web browser cookie.

If, at operation 320, it is determined that the criterion for the currently executing treatment component 106 has not been met, then the routine 300 returns to operation 315 where the orthogonal programming component forwards the request to the application program 104 for normal processing. However, if at operation 320, it is determined that the criterion for the currently executing treatment component 106 has been met, then the routine 320 continues to operation 325 where the orthogonal programming component 102 invokes the treatment component 106 to implement the experimental behavior with respect to the request. It should be understood that the treatment component 106 may be invoked directly by calling a routine within the orthogonal programming component 102 to implement the experimental behavior, or the request may be forwarded to the treatment server 150 for implementing the experimental behavior, or, if the experimental behavior includes omitting a control behavior associated with the application program 104, then no action may be taken by the orthogonal programming component 102. From operation 325, the routine 300 then ends.

As briefly discussed above, it should be understood that the experimental behavior may be implemented without a change being made in the application program 104 (or without the application program 104 having to be redeployed), thereby expediting the testing of new or modified application program behavior. For example, in accordance with an embodiment, a treatment component may implement, for thirty percent of user requests for a web page containing a banner ad, an experimental behavior in which the banner ad is repositioned from the originally requested web page. An analysis component (not shown) may then be utilized to compare mouse clicks on the banner ad between control (i.e., non-experimental) users and experimental users, thereby enabling a rapid determination of whether the evaluated experimental behavior should be made a permanently feature of the web page.

Figure 4:
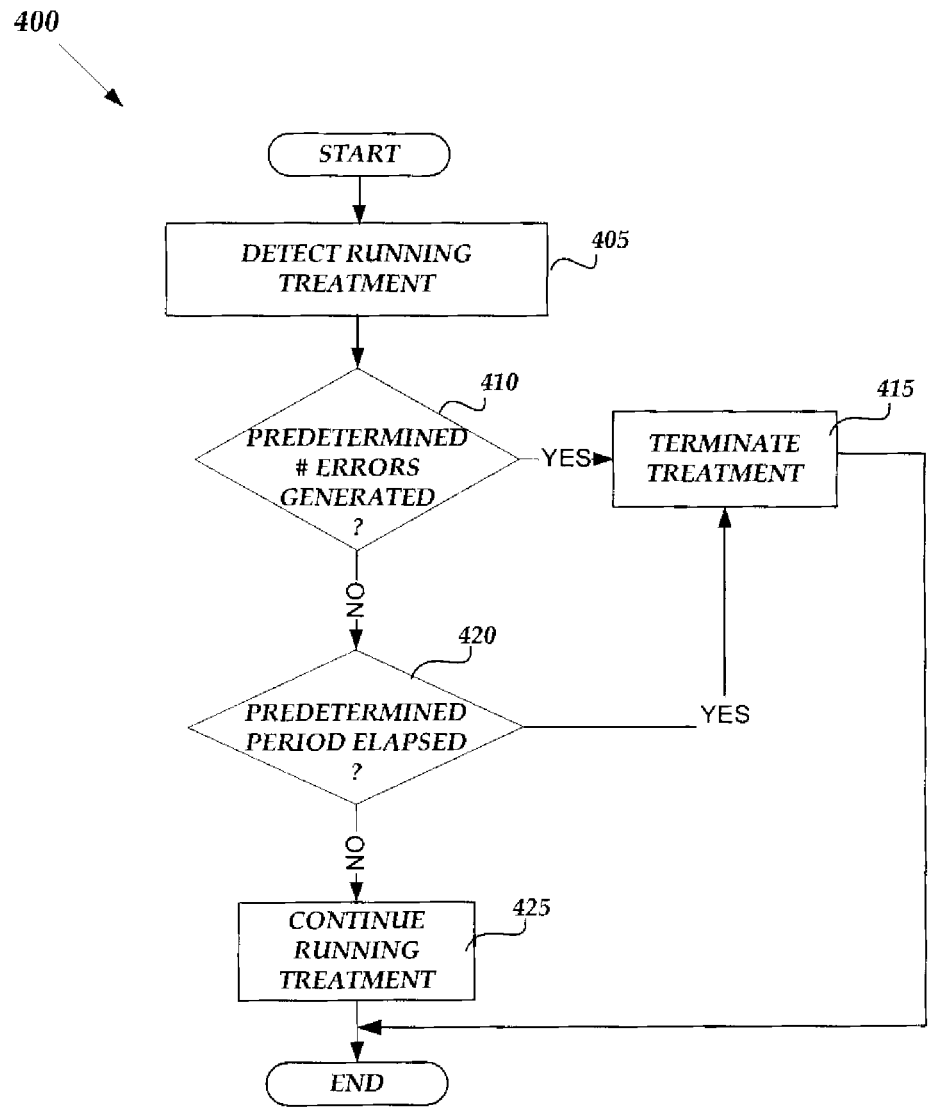
FIG. 4 is a flow diagram illustrating a routine for monitoring the execution of an experiment for implementing new application program concepts on a server, in accordance with various embodiments.

Referring now to FIG. 4, an illustrative routine 400 for monitoring the execution of an experiment for implementing an experimental behavior utilizing an orthogonal programming component, in accordance an embodiment, will be described. It will be appreciated that the routine 400 may be periodically called by the monitoring component 112. The routine 400 begins at operation 405, where the monitoring component 112 in the system 100 detects whether the treatment component 106 is running.

From operation 405, the routine 400 continues to operation 410, where the monitoring component 112 determines whether a predetermined number of errors have been generated by the executing treatment component 106. If, at operation 410, it is determined that the predetermined number of errors have been generated, then the routine 410 continues to operation 415 where the monitoring component 112 automatically sends an instruction to the treatment component 106 to terminate.

If, at operation 410, it is determined that the predetermined number of errors have not been generated, then the routine 400 branches to operation 420 where the monitoring component 112 determines whether a predetermined period for executing the treatment component 106 (e.g., ten days) has elapsed. If, at operation 420, it is determined that the predetermined period has elapsed, then the routine 400 returns to operation 415 where the monitoring component 112 automatically sends an instruction to the treatment component 106 to terminate.

If, however, at operation 420, it is determined that the predetermined period has not elapsed, then the routine 400 continues to operation 425 where the treatment component 106 continues to run. The routine 400 then ends.

It should be understood that the criteria for terminating an experiment, discussed above with respect to FIG. 4, is not limited to the above-described operations and that many variations or alternatives are possible and are within the scope of the various embodiments discussed herein. For example, the monitoring component 112 may cause the experiment to be terminated upon the occurrence of both the predetermined number of errors being generated and the predetermined period having elapsed. Alternatively, the monitoring component 112 may allow the experiment to continue running if either one of the error or elapsed period thresholds have not been met. Finally, it should be appreciated that other criteria for terminating an experiment may also be utilized in accordance with various embodiments.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of utilizing an orthogonal programming component to expedite the testing of an experimental behavior with respect to an application program, comprising:
   intercepting in the orthogonal programming component, a request to access an application program;
   in response to intercepting the application program request, determining in the orthogonal programming component, whether a treatment component is currently executing in a first environment, the treatment component comprising branches of the application program with additional program code for implementing the experimental behavior and other program code for logging results of user activity for analysis, the experimental behavior being implemented in the first environment, the first environment being independent of a second environment in which the application program is executed without implementing the experimental behavior, the experimental behavior comprising omitting a control behavior associated with the application program, the experimental behavior further comprising new application program concepts undergoing evaluation, the new application program concepts being associated with the requested application program, the new application program concepts being visually indicated to pertinent development members by graphically repositioning a displayed advertisement banner to determine whether increased activity is received by the application as a result of the repositioning, the increased activity comprising a number of user actions received on the repositioned advertising banner being higher than a number of user actions received on a previous position of the advertising banner, the number of user actions and activity thereof being increased due to a development weight given to the new application concepts associated with the experimental behavior, the development weight associated with the experimental behavior being implemented in the first environment being based on determining whether a development constraint has been met via meeting a criterion, the orthogonal programming component being independent of the application program;
   if the treatment component is currently executing, then determining in the orthogonal programming component on the server, whether at least one experiment criterion has been met;
   if the at least one experiment criterion has been met, then invoking, from the orthogonal programming component, the treatment component to implement the experimental behavior without a change being made in the application program, thereby expediting the testing of the experimental behavior;
   if the treatment component is not currently executing, then sending the request from the orthogonal programming component directly to the application program, the application program being executed in the second environment, the second environment being distinct from a development context of the first environment; and
   if the at least one experiment criterion has not been met, then sending the request from the orthogonal programming component directly to the application program executing in the second environment, the second environment being distinct from the development context of the first environment.

2. The method of claim 1, wherein intercepting, in the orthogonal programming component, a request to access an application program comprises intercepting the request in an Aspect Oriented Programming (AOP) component.

3. The method of claim 1, wherein intercepting, in the orthogonal programming component, a request to access an application program comprises intercepting a Hypertext Transfer Protocol (HTTP) request.

4. The method of claim 1, wherein intercepting, in the orthogonal programming component, a request to access an application program stored on the server comprises intercepting a Simple Object Access Protocol (SOAP) request.

5. The method of claim 1, wherein determining, in the orthogonal programming component, whether at least one experiment criterion has been met from the request comprises:
   retrieving identification data from the request; and
   determining from the identification data whether the at least one experiment criterion has been met.

6. The method of claim 5, wherein retrieving identification data from the request comprises retrieving data from at least one of an HTTP header and a cookie.

7. The method of claim 1, wherein invoking the treatment component, from the orthogonal programming component, to implement the experimental behavior comprises sending the request from the orthogonal programming component to an external treatment server.

8. The method of claim 7, wherein sending the request from the orthogonal programming component to the application program comprises utilizing an event handler to send the request to the application program.

9. The method claim 1, wherein invoking the treatment component, from the orthogonal programming component, to implement the experimental behavior without making a change the application program comprises calling a routine from within the orthogonal programming component.

10. The method of claim 1, wherein determining in the orthogonal programming component on the server, whether at least one experiment criterion has been met comprises:
    utilizing an Application Programming Interface (API) call to retrieve the at least one experiment criterion from an experiment database;
    retrieving identification data from the request to access the application program; and
    determining, based on the retrieved at least one experiment criterion and the identification, whether the at least one experiment criterion has been meet.

11. A computer system to expedite the testing of an experimental behavior with respect to an application program, comprising:
    a memory storage device for storing executable program code; and
    a processor, functionally coupled to the memory storage device, the processor being responsive to computer-executable instructions contained in the program code and operative to:

receive, in an orthogonal programming component, a request to access an application program and to invoke the experimental behavior with respect to the application program, the experimental behavior being implemented in a first environment, the first environment being independent of a second environment in which the application program is executed without implementing the experimental behavior, the experimental behavior comprising omitting a control behavior associated with the application program, the experimental behavior further comprising new features associated with the requested application program;

store, in an experiment database in communication with the orthogonal programming component, an experiment configuration, an experiment status, and an experiment logging table, the experiment configuration file comprising at least one experiment criterion for implementing the experimental behavior;

invoke, in the first environment, a treatment component in communication with the orthogonal programming component and the experiment database to implement the experimental behavior if the at least one experiment criterion has been satisfied without a change being made in the application program, thereby expediting the testing of the experimental behavior, the treatment component comprising branches of the application program with additional program code for implementing the experimental behavior and other program code for logging results of user activity for analysis, the experimental behavior comprising new application program concepts undergoing evaluation, the new application program concepts being associated with the requested application program, the new application program concepts being visually indicated to pertinent development members by graphically repositioning a displayed advertisement banner to determine whether increased user activity is received by the application as a result of the repositioning, the increased activity comprising a number of user actions received on the repositioned advertising banner being higher than a number of user actions received on a previous position of the advertising banner, the number of user actions and activity thereof being increased due to a development weight given to the new application concepts associated with the experimental behavior, the development weight associated with the experimental behavior being implemented in the first environment being based on determining whether a development constraint has been met via meeting a criterion;

monitor, in a monitoring component in communication with the treatment component, the implementation of the experimental behavior and to terminate the experimental behavior if at least one termination criterion is met;

if the treatment component is not currently executing, send, from a handler component, the request from the orthogonal programming component directly to the application program, the application program being executed in the second environment, the second environment being distinct from a development context of the first environment; and if the at least one experiment criterion has not been met, then send, from the handler component, the request from the orthogonal programming component directly to the application program executing in the second environment, the second environment being distinct from the development context of the first environment.

12. The system of claim 11, wherein the orthogonal programming component comprises an Aspect Oriented Programming (AOP) component.

13. The system of claim 11, wherein the at least one termination criteria comprises a predetermined number of errors generated by the experimental behavior.

14. The system of claim 11, wherein the at least one termination criteria comprises a predetermined period in which the experimental behavior is executing.

15. The system of claim 11, wherein the application program comprises program code for generating a web page.

16. A computer-readable medium, wherein the computer-readable medium does not include a transmission signal, the computer-readable medium storing computer-executable instructions, which when executed on a computer, will cause the computer to perform a method of utilizing an orthogonal programming component to expedite the testing of an experimental behavior with respect to an application program, comprising:

intercepting in the orthogonal programming component, a request to access an application program;

in response to intercepting the application program request, determining in the orthogonal programming component, whether a treatment component is currently executing in a first environment, the treatment component comprising branches of the application program with additional program code for implementing the experimental behavior and other program code for logging results of user activity for analysis, the experimental behavior being implemented in the first environment, the first environment being independent of a second environment in which the application program is executed without implementing the experimental behavior, the experimental behavior comprising omitting a control behavior associated with the application program, the experimental behavior further comprising new application program concepts undergoing evaluation, the new application program concepts being associated with the requested application program, the new application program concepts being visually indicated to pertinent development members by graphically repositioning a displayed advertisement banner to determine whether increased activity is received by the application as a result of the repositioning, the increased activity comprising a number of user actions received on the repositioned advertising banner being higher than a number of user actions received on a previous position of the advertising banner, the number of user actions and activity thereof being increased due to a development weight given to the new application concepts associated with the experimental behavior, the development weight associated with the experimental behavior being implemented in the first environment being based on determining whether a development constraint has been met via meeting a criterion, the orthogonal programming component being independent of the application program;

if the treatment component is currently executing, then determining in the orthogonal programming component on the server, whether at least one experiment criterion has been met;

if the at least one experiment criterion has been met, then invoking, from the orthogonal programming component, the treatment component to implement the experimental behavior without a change being made in the application program, thereby expediting the testing of the experimental behavior;

if the treatment component is not currently executing, then sending the request from the orthogonal programming component directly to the application program, the application program being executed in the second environment, the second environment being distinct from a development context of the first environment; and if the at least one experiment criterion has not been met, then sending the request from the orthogonal programming component directly to the application program executing in the second environment, the second environment being distinct from the development context of the first environment.

17. The computer-readable medium of claim 16, wherein intercepting, in the orthogonal programming component, a request to access an application program comprises intercepting the request in an Aspect Oriented Programming (AOP) component.

* * * * *